(12) United States Patent
Yang

(10) Patent No.: US 12,101,460 B2
(45) Date of Patent: Sep. 24, 2024

(54) RESOLUTION TEST CARD FOR CAMERA MODULE

(71) Applicant: TRIPLE WIN TECHNOLOGY(SHENZHEN) CO.LTD., Shenzhen (CN)

(72) Inventor: Jing Yang, Jincheng (CN)

(73) Assignee: TRIPLE WIN TECHNOLOGY (SHENZHEN) CO.LTD., Shenzhen (CN)

( * ) Notice: Subject to any disclaimer, the term of this patent is extended or adjusted under 35 U.S.C. 154(b) by 372 days.

(21) Appl. No.: 17/697,568

(22) Filed: Mar. 17, 2022

(65) Prior Publication Data

US 2023/0088893 A1   Mar. 23, 2023

(30) Foreign Application Priority Data

Sep. 18, 2021   (CN) .......................... 202111132882.3

(51) Int. Cl.
*H04N 17/00*   (2006.01)
*G06T 7/90*   (2017.01)

(52) U.S. Cl.
CPC ............. *H04N 17/002* (2013.01); *G06T 7/90* (2017.01)

(58) Field of Classification Search
CPC .. H04N 1/00045; H04N 1/1913; H04N 17/00; G06T 7/90
USPC .................................................. 382/164, 165
See application file for complete search history.

(56) References Cited

FOREIGN PATENT DOCUMENTS

| CN | 103731665 B | * | 12/2015 |
|---|---|---|---|
| CN | 109451302 A | | 3/2019 |
| CN | 112887704 A | | 6/2021 |

* cited by examiner

*Primary Examiner* — Jamares Q Washington
(74) *Attorney, Agent, or Firm* — ScienBiziP, P.C.

(57) ABSTRACT

A resolution test card for camera module includes a central region and a plurality of corner regions surrounding the central region. Both the central region and each corner region includes color blocks arranged in an array without gap. Each color block includes at least two straight edges. Any adjacent two color blocks sharing one straight edge in both the central region and each corner region have different colors. Any of the at least two straight edges is inclined relative to a first direction and a second direction perpendicular to the first direction; the at least two straight edges includes a first straight edge and a second straight edge perpendicular to each other.

12 Claims, 6 Drawing Sheets

RESOLUTION TEST CARD FOR CAMERA MODULE

FIELD

The subject matter herein generally relates to optical field, particularly relates to a resolution test card for camera module.

BACKGROUND

For efficient production of current camera modules, their resolution must be tested, especially the spatial frequency response (SFR). Many camera modules need to be tested for SFR resolution at the same time, but the testing of different types of camera modules requires that the resolution test card be set to a checkerboard layout including a plurality of color blocks 50A, as shown in FIG. 1. That is, a plurality of white color blocks and a plurality of black color blocks are arranged in a staggered matrix. To test the SFR resolution, it is usually necessary to test in a central region and in four corner regions of the test card, in both horizontal and vertical directions. However, the checkerboard layout of the test card means that the deflection direction and deflection angle of all color blocks of the test card are the same, and the horizontal and vertical components of the SFR resolution test at individual corner regions will be greatly different, leading to a difference in SFR resolution at different corner regions. This affects overall analysis of the resolution in the corner regions, and further affects the overall analysis of the resolution of the camera module.

Therefore, there is room for improvement in the art.

BRIEF DESCRIPTION OF THE DRAWINGS

Implementations of the present technology will now be described, by way of embodiments only, with reference to the attached figures.

DETAILED DESCRIPTION

Figure 1:
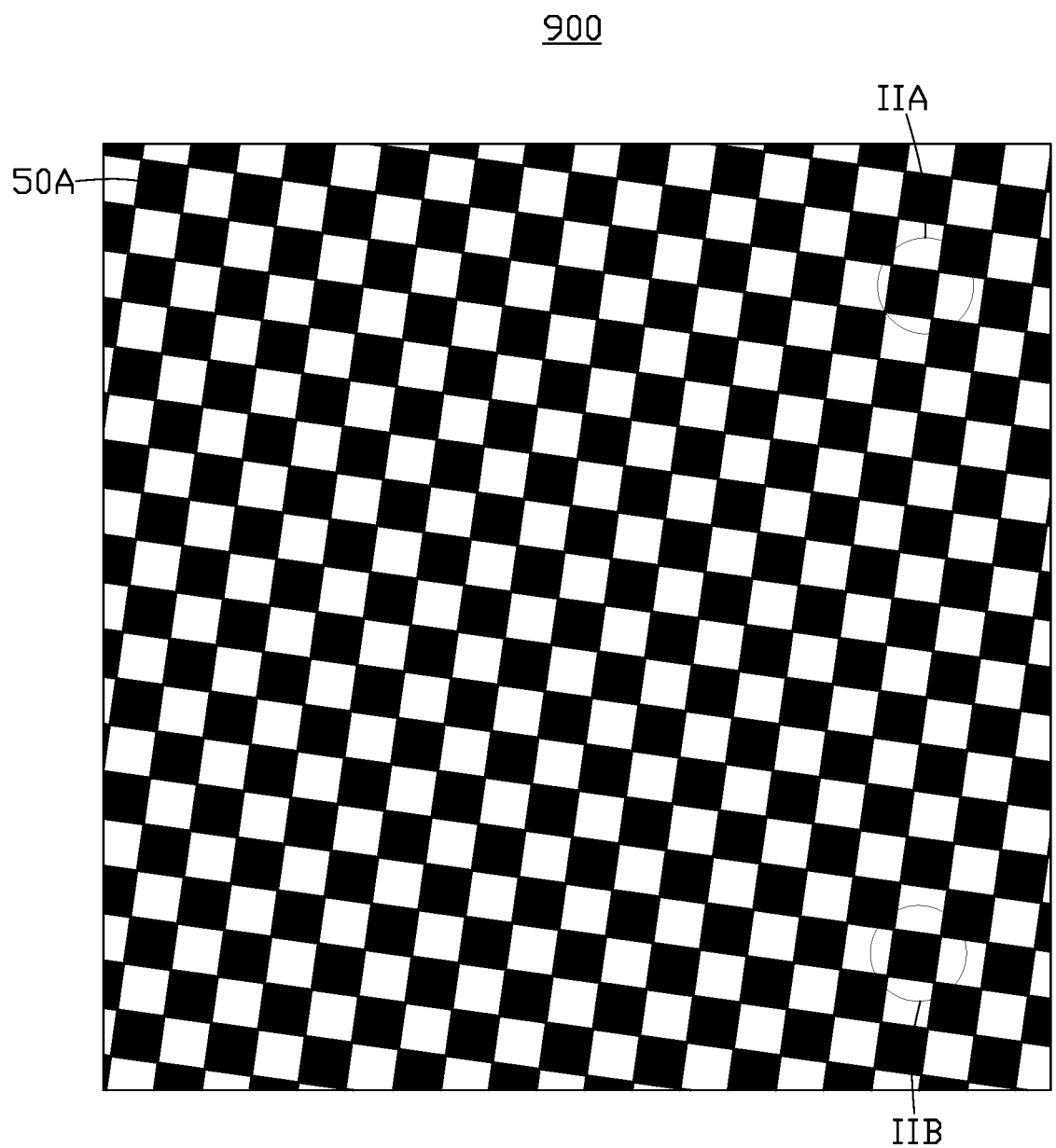
FIG. 1 is a view of a traditional resolution test card for camera module in prior art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series, and the like.

Electronic products such as smart phones usually include camera modules. Before a camera module is applied to an electronic product, it is necessary to test performance of the camera module to ensure that the camera module meets expected requirements. The resolution of the camera module is one of the key indicators used to evaluate the performance of the camera module. The resolution is definition of the image taken by the camera module. The testing methods for resolution can include modulation transfer function (MTF) testing and spatial frequency response (SFR) testing. Taking SFR detection as an example, the present disclosure exemplarily describes the test card to be used in the testing process, its principle, and application method.

In a process of making the camera module, the lens needs to be fixed to a sensor. In order to maintain good resolution of the camera module, it is necessary to calculate the SFR resolution of the camera module according to the resolution of the lens before assembly, so as to facilitate adaptive alignment (AA) compensation. That is, a best relative position between the lens and the sensor before assembly is calculated in advance before assembly, and then the assembly operation is carried out. The resolution of the lens itself is divided into a component along a radial direction S and a component along a tangential direction T. The SFR resolution of the camera module is divided into a V component calculated by selecting a region along a horizontal direction and an H component calculated by selecting a region along a vertical direction, and it is necessary to convert the S component and the T component of the lens into the V component and the H component respectively of SFR resolution.

Figure 2A:
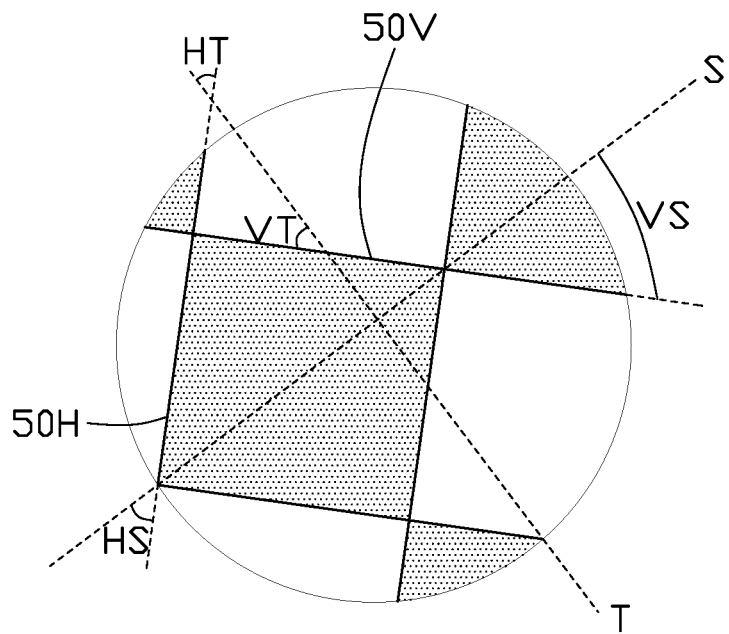
FIG. 2A is an enlarged view of portion IIA (top right-hand corner portion) in FIG. 1.
Figure 2B:
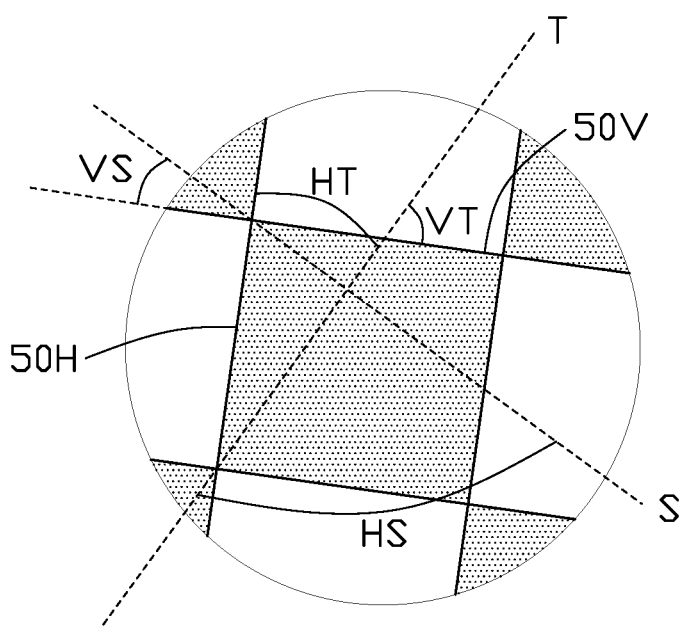
FIG. 2B is an enlarged view of portion IIB portion (bottom right-hand corner portion) in FIG. 1.

FIG. 1 shows a resolution test card 900 of camera module commonly used in SFR resolution test. The resolution test card 900 includes staggered black blocks and white blocks. Each color block 50A is rectangular and has a same tilt direction and tilt angle. FIG. 2A and FIG. 2B are enlarged views of different corner regions of the resolution test card 900. The color block 50A includes a first straight edge 50V and a second straight edge 50H perpendicular to each other. The radial direction S is specifically a direction extending from a lens center to the apex. For the resolution test card 900, the radial direction S is set as the direction from the geometric center of the resolution test card 900 to one of the apexes, that is, along the diagonal line of the resolution test card 900. The tangential direction T is perpendicular to the radial direction S. The radial direction S and the first straight edge 50V of the color block 50A form a first included angle VS; and the radial direction S and the second straight edge 50H of the color block 50A form a third included angle HS. The tangential direction T and the first straight edge 50V of the color block 50A form a second included angle VT and the tangential direction T and the second straight edge 50H of the color block 50A form a fourth included angle HT. Since the radial direction S and the tangential direction T are perpendicular to each other, and the first straight edge 50V and the second straight edge 50h are perpendicular to each other, it is easy to obtain that the first included angle VS is equal to the fourth included angle HT; and the second included angle VT is equal to the third included angle HS. Assuming that the resolution component of the lens along the radial direction S is $S_0$ and the resolution component along the tangential direction T is $T_0$, the H component of the SFR resolution can be expressed as:

$$H_0 = \cos HT * T_0 + \cos HS * S_0 \quad \text{(formula (1));}$$

The V component of SFR resolution can be expressed as:

$$V_0 = \cos VT * T_0 + \cos VS * S_0 = \cos HS * T_0 + \cos HT * S_0 \quad \text{(formula (2))}.$$

It can be seen from formula (1) and formula (2) that both the H component and the V component of SFR resolution are related to the third included angle HS and the fourth included angle HT, as well as the component $S_0$ and the component $T_0$. In an ideal state, the resolution component along the radial direction S and the resolution component along the tangential direction T of the lens at a corner region (as shown in FIG. 2A and FIG. 2B) are the same. At this time, the H component and V component of the SFR resolution are also the same. However, in practical application, there may be a difference between the resolution component of the lens along the radial direction S and the resolution component along the tangential direction T. At this time, the H component and V component of the SFR resolution will also be affected by the third included angle HS and the fourth included angle HT. The greater the difference between the third included angle HS and the fourth included angle HT, the greater will be the impact on the H component and the V component.

FIG. 2A shows both the third included angle HS and the fourth included angle HT being at 45° at one corner region of the resolution test card 900. At this time, the H component and the V component of SFR resolution can be expressed as:

$$H_0 = V_0 = \cos 45° * (T_0 + S_0) \quad \text{(formula (3))}.$$

That is, the component $S_0$ and the component $T_0$ now have the least influence on the H and V components of SFR resolution. FIG. 2B shows another corner region of the resolution test card 900. At this time, the third included angle HS is not equal to the fourth included angle HT, and the H component and the V component of SFR resolution are affected by the third included angle HS and the fourth included angle HT, the component $S_0$ and the component $T_0$ at the same time, thus affecting the value of SFR resolution at this corner region.

It can be seen that when the tilt directions and tilt angles of all color blocks 50A are the same, there are also differences in calculation methods of SFR resolution of a same camera module in different corner regions of the resolution test card 900, which affects the overall analysis of the SFR resolution.

Accordingly, the present disclosure provides a resolution test card for camera module, which eliminates the above uncertainties.

Figure 3:
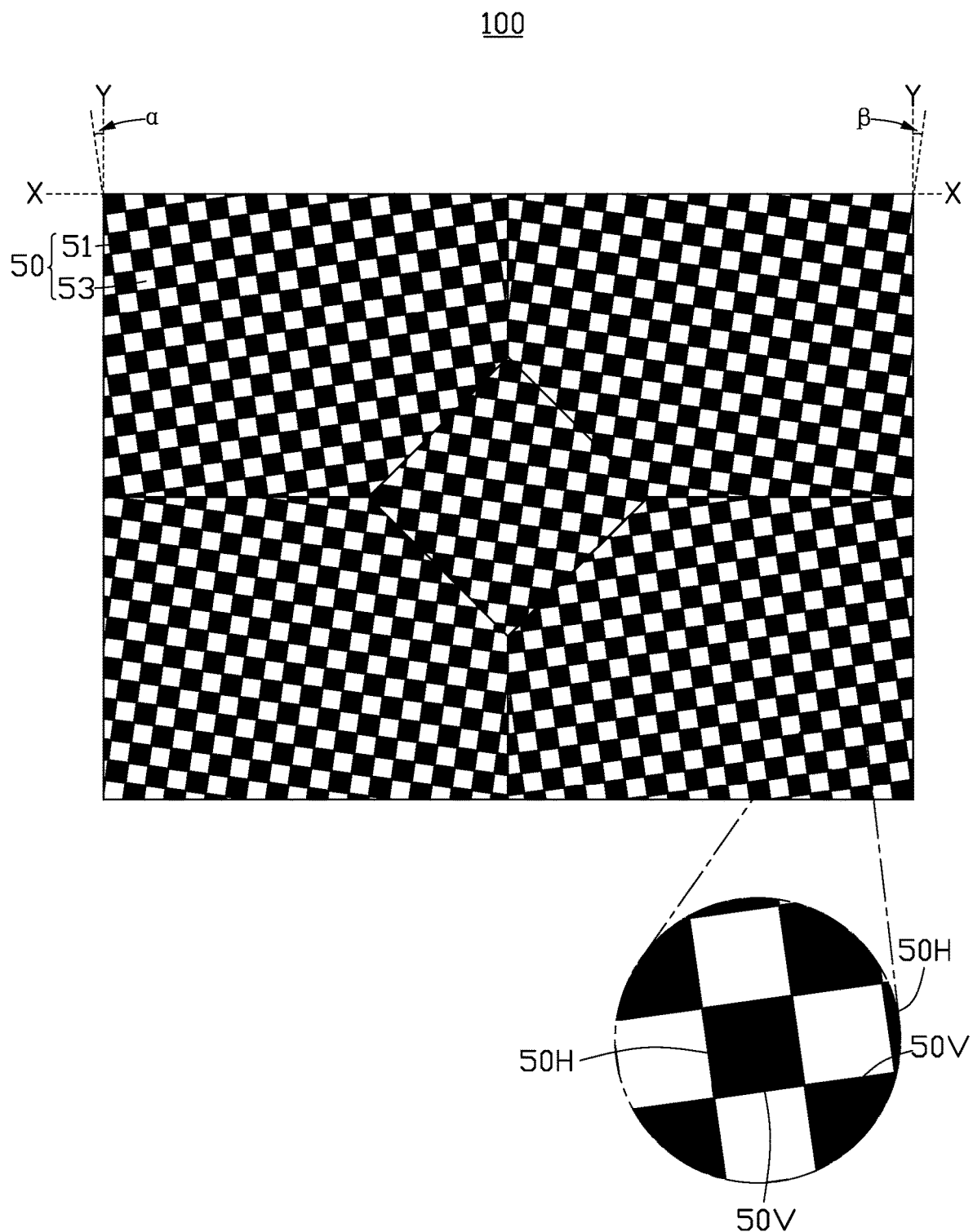
FIG. 3 is a view of a resolution test card for camera module according to an embodiment of the present disclosure.
Figure 4:
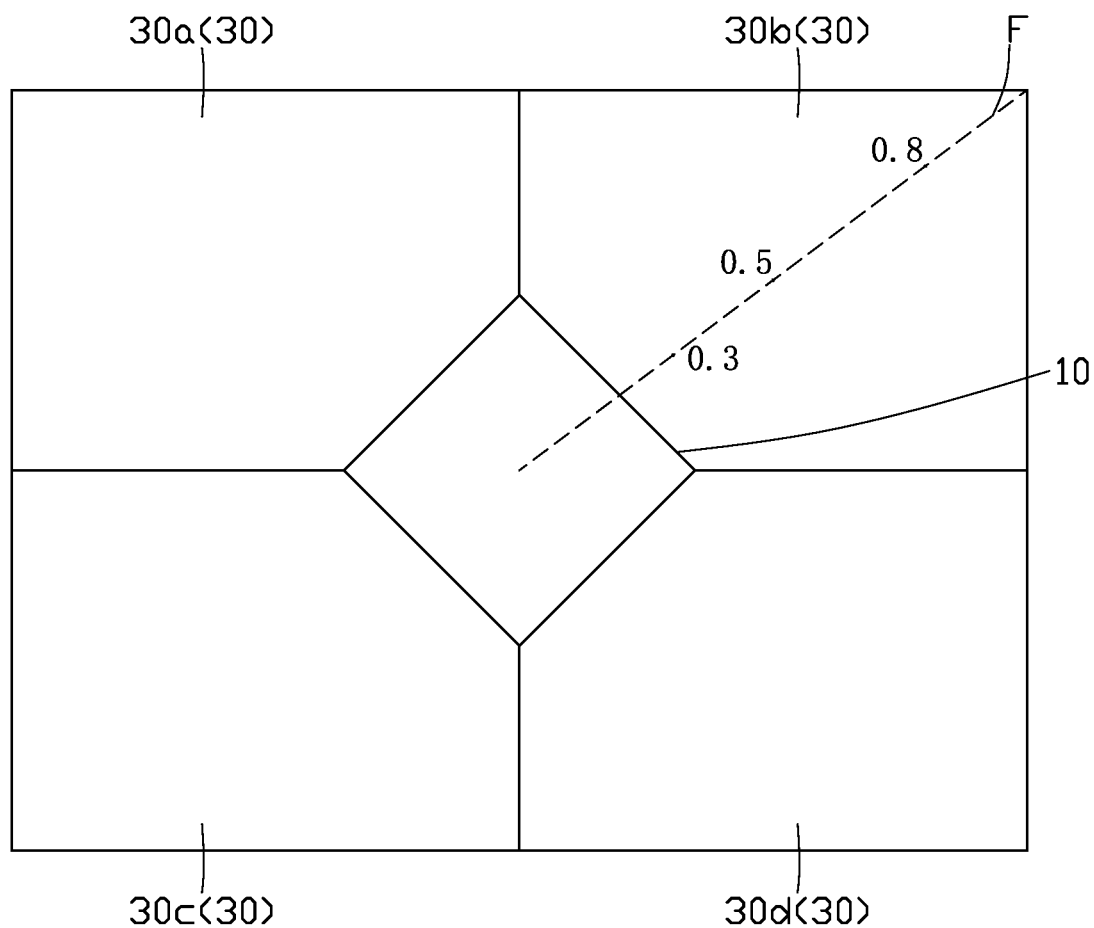
FIG. 4 shows field of view and regional distribution of the resolution test card of FIG. 3.

As shown in FIG. 3 and FIG. 4, the resolution test card 100 includes a central region 10 and four corner regions 30 connecting to the central region 10. The four corner regions 30 includes corner region 30a, corner region 30b, corner region 30c, and corner region 30d, all surrounding the central region 10 and connected to each other. In this embodiment, the central region 10 is a square, and each corner region 30 has a same shape. The central region 10 includes a plurality of color blocks 50 arranged in an array.

Each corner region 30 includes a plurality of color blocks 50 arranged in an array. The color blocks 50 are closely arranged without any gap, and the colors of any adjacent two color blocks 50 on one common edge are different. Each color block 50 includes two first straight edges 50V and two second straight edges 50H. Each second straight edge 50H is perpendicular to each first straight edge 50V. The first straight edge 50V is inclined with respect to both a first direction X and a second direction Y, and the second straight edge 50H is inclined with respect to the first direction X and the second direction Y. The first direction X is perpendicular to the second direction Y. In any adjacent two corner regions 30, the inclination direction and inclination angle of the first straight edges 50V in one corner region 30 are symmetrical to the inclination direction and inclination angle of the first straight edges 50V in the other corner region 30 relative to the first direction X and the second direction Y.

By the above settings, the formulas for calculating the H component and the V component of SFR resolution in each corner region 30 are consistent and the same, to avoid difference in SFR resolution component caused by applying different formulas.

In one embodiment, the first straight edge 50V of each color block 50 is inclined by 3°~10° relative to the first direction X, a preferred inclination is 8°. The second straight edge 50h of each color block 50 is inclined by 3°~10° relative to the second direction Y, a preferred inclination is 8°.

In one embodiment, the black blocks 51 and the white blocks 53 are arranged alternately along an extension direction of the first straight edge 50V. The black blocks 51 and the white blocks 53 are also arranged alternately along an extension direction of the second straight edge 50H. In other embodiments, the black block 51 and the white block 53 can have different colors, preferably with a high contrast difference between different color blocks 50.

In one embodiment, each color block 50 is rectangular and has the same size, a preferred shape is square.

In one embodiment, the inclination direction and inclination angle of the first straight edge 50V of each color block 50 in the central region 10 relative to the first direction X are the same and the inclination direction and inclination angle of the second straight edge 50H of each color block 50 in the central region 10 relative to the second direction Y are the same. In the same corner region 30, the inclination direction and inclination angle of the first straight edge 50V of each color block 50 relative to the first direction X are the same and the inclination direction and inclination angle of the second straight edge 50h of each color block 50 relative to the second direction Y are the same.

In one embodiment, the resolution test card 100 is a rectangle having a long side and a short side, the first direction X is parallel to the long side direction of the rectangle, and the second direction Y is parallel to the short side direction of the rectangle. That is, the central region 10 and the corner regions 30 connect together to be a rectangle. The geometric center of the center region 10 coincides with the geometric center of the resolution test card 100, and the first direction X is on the right of the geometric center, the second direction Y is above the geometric center. In a preferred scheme, a length to width ratio of the resolution test card 100 is 4:3. At this time, the included angle between the diagonal of the resolution test card 100 and the first direction X or the second direction Y is 37° or 53°, that is, 45°±8°.

In one embodiment, the corner regions 30 includes the corner region 30A arranged at the top left of the central region 10, a corner region 30*b* at the top right of the central region 10, a corner region 30*c* at the lower left of the central region 10 and a corner region 30*d* at the lower right of the central region 10.

In one embodiment, based on the direction of the top looking resolution test card 100, the first straight edge 50V of each color block 50 located in the corner region 30*a* and the corner region 30*d* has a first inclination angle α inclined counterclockwise with respect to the first direction X; the second straight edge 50*h* of each color block 50 has the first inclination angle α inclined counterclockwise with respect to the second direction Y. The first straight edge 50V of each color block 50 located in the center region 10, in the corner region 30*b*, and in the corner region 30*c* has a second inclination angle β inclined clockwise with respect to the first direction X; the second straight edge 50*h* of each color block 50 has the second inclination angle β inclined clockwise with respect to the second direction Y. The first inclination angle α and the second inclination angle β have an equal value, a preferred inclination is 8°. In other embodiments, the inclination direction and the inclination angle of the first straight edge 50V and the second straight edge 50H of each color block 50 in the central region 10 may also be the same as that of the first straight edge 50V and the second straight edge 50*h* of each color block 50 in the corner region 30*a* and in the corner region 30*d*.

By the above setting, an included angle between the radial direction S extending along any diagonal direction on the resolution test card 100 and the first straight edge 50V of each color block 50 in the central region 10 and in any corner region 30 can be 45°; an included angle between the radial direction S extending along any diagonal direction on the resolution test card 100 and the second straight edge 50*h* of each color block 50 in the central region 10 and in any corner region 30 can be 45°; so that formula (3) can be directly used to calculate the H component and V component of SFR resolution. This minimizes the impact of lens component $S_0$ and component $T_0$ on H component and V component, so as to facilitate AA compensation and optimize the overall resolution of camera module.

As shown in FIG. 4, in one embodiment, the geometric center of the resolution test card 100 to any apex of the resolution test card 100 is set as the view field F of the camera module being tested. In each corner region 30, the SFR resolution at 0.3 times the view field F, 0.5 times the view field F, and 0.8 times the view field F each need to be tested. Therefore, a boundary of the central region 10 does not exceed 0.3 times the view field F. In other embodiments, only the SFR resolution at 0.5 times the view field F and 0.8 times the view field F needs to be tested, so the boundary of the central region 10 can also be located between 0.3 and 0.5 times the view field F.

In one embodiment, a length of any edge of each color block 50 does not exceed 0.08 times the long side length of the resolution test card 100, and a preferred length is 0.064 times the long side length.

Figure 5:
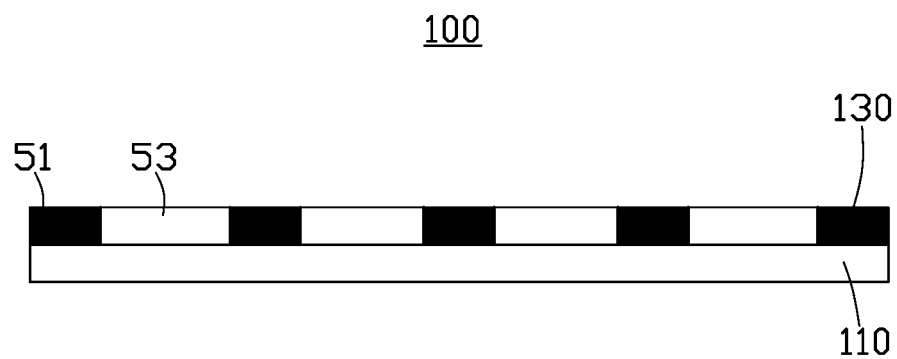
FIG. 5 is a cross-sectional view of the resolution test card as shown in FIG. 3.

In one embodiment, as shown in FIG. 5, the resolution test card 100 includes a substrate 110 and a functional layer 130 on the substrate 110. The substrate 110 can be cardboard, film or other materials, and the functional layer 130 can be a printing layer, or a nested structure or filling structure based on the substrate 110. The functional layer 130 can be specifically set to realize the color block 50 arrangement structure as shown in FIG. 3, which is not to be specifically limited by the present disclosure.

The resolution test card 100 provided by the present disclosure sets out the central region 10 and four corner regions 30, and makes the first straight edge 50V and the second straight edge 50H of the color block 50 in each region have symmetrical tilt direction and tilt angle, so as to make the calculation formulas of H component and V component of SFR resolution consistent, which reduces the influence of the resolution of the lens itself on the resolution of the camera module, is conducive to AA compensation for the camera module, and reduces difference between the H component and V component of the subsequent measurement of the SFR resolution, and improves the overall resolution of the camera module.

Figure 6:
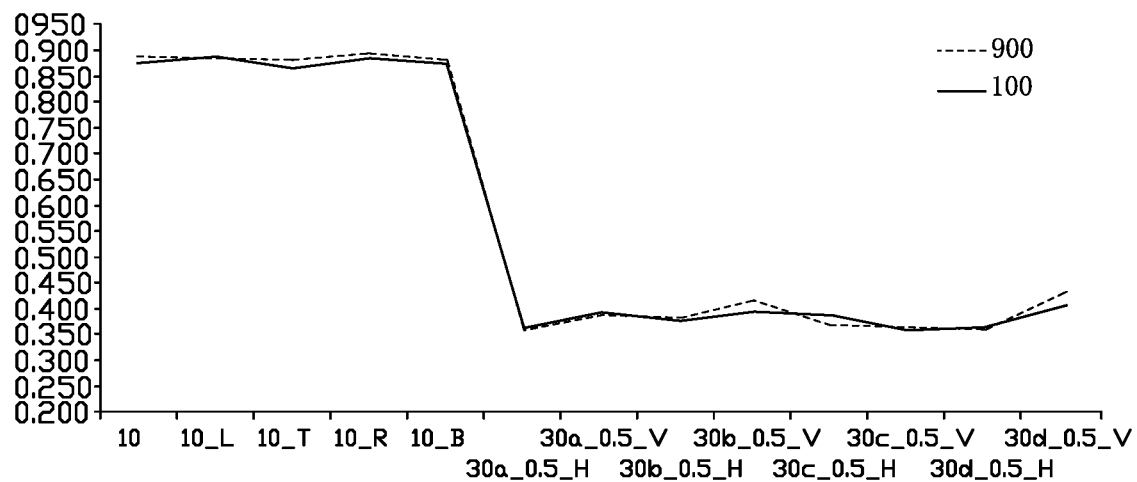
FIG. 6 is a diagram comparing resolution-testing capabilities of different resolution test cards.

FIG. 6 is a diagram comparing resolution of the resolution test card 900 and the resolution test card 100. In one embodiment, as shown in FIG. 6, where 10, 10_L, 10_T, 10_R, 10_B is the resolution measured in the central region 10, 30*a*_0.5_H is the H component of SFR resolution of the corner region 30*a* at 0.5 times the view field F; 30*a*_0.5_V is the V component of SFR resolution of the corner region 30*a* at 0.5 times the view field F; remainder are the same. It can be seen that using the resolution test card 100 provided in this embodiment reduces the difference between the H component and the V component of SFR resolution in each corner region 30. On-line verification, using the resolution test card 100 of the camera module provided in the present disclosure, long-range defect rate of the camera module is reduced from 0.4% to 0.3%, the close-range defect rate is reduced from 0.15% to 0.07%, and overall yield is increased from 96.98% to 97.16%.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A resolution test card configured for camera module comprising:
   a central region, the central region comprising a plurality of color blocks arranged in an array without gap; and
   a plurality of corner regions, the plurality of corner regions connecting to each other and surrounding and connecting to the central region, each of the plurality of corner regions comprising a plurality of color blocks arranged in an array without gap;
   wherein each of the plurality of color blocks comprises at least two straight edges; any adjacent two of the color blocks sharing one straight edge in the central region have different colors; any adjacent two of the color blocks sharing one straight edge in each of the plurality of corner regions have different colors;
   wherein any of the at least two straight edges is inclined relative to both a first direction and a second direction perpendicular to the first direction; the at least two straight edges comprise a first straight edge and a second straight edge perpendicular to each other;
   wherein in any adjacent two corner regions, an inclination direction and an inclination angle of the first straight edge in one of any adjacent two of the corner regions are symmetrical to an inclination direction and inclination angle of the first straight edge in the other of any adjacent two of the corner regions relative to both the first direction and the second direction.

2. The resolution test card of claim 1, wherein the inclination angle of the straight edge relative to the first direction or the second direction ranges from 3 degrees to 10 degrees.

3. The resolution test card of claim 1, wherein the plurality of color blocks in the central region comprises white blocks and black blocks alternately arranged along both an extension direction of the first straight edge and an extension direction of the second straight edge; the plurality of color blocks in the each of the plurality of corner regions comprises white blocks and black blocks alternately arranged along both an extension direction of the first straight edge and an extension direction of the second straight edge.

4. The resolution test card of claim 1, wherein each of the plurality of color blocks in both the central region and each of the plurality of corner regions is rectangular and has a same size.

5. The resolution test card of claim 1, wherein in the central region, the inclination direction and inclination angle of each first straight edge relative to the first direction or the second direction are the same, and the inclination direction and inclination angle of each second straight edge relative to the first direction or the second direction are the same; in each of the plurality of corner regions, the inclination direction and inclination angle of each first straight edge relative to the first direction or the second direction are the same; and the inclination direction and inclination angle of each second straight edge relative to the first direction or the second direction are the same.

6. The resolution test card of claim 1, wherein the resolution test card is a rectangle having a long side and a short side; the long side of the rectangle is parallel to the first direction, and the short side of the rectangle is parallel to the second direction; a geometric center of the central region coincides with a geometric center of the resolution test card.

7. The resolution test card of claim 6, wherein the first direction is set to the right of the geometric center, and the second direction is above the geometric center.

8. The resolution test card of claim 6, wherein the plurality of corner regions is four corner regions, the four corner regions are arranged in an upper left, a lower left, an upper right, and a lower right direction of the central region, respectively.

9. The resolution test card of claim 8, wherein the central region is a square, and each of the four corner regions has a same shape.

10. The resolution test card of claim 8, wherein an inclination direction and an inclination angle of the first straight edge in the central region are the same as an inclination direction and an inclination angle of the first straight edge in any one of the plurality of corner regions.

11. The resolution test card of claim 6, wherein a line segment from the geometric center of the resolution test card to any apex is set as a view field; in a direction from the geometric center of the resolution test card to any apex, a boundary of the central region does not exceed a position of 0.3 times the view field.

12. The resolution test card of claim 6, wherein an edge length of each color block does not exceed 0.08 times a length of the long side of the resolution test card.

* * * * *